(12) United States Patent
Bianco

(10) Patent No.: US 9,132,743 B2
(45) Date of Patent: Sep. 15, 2015

(54) VALET EVSE SYSTEM

(75) Inventor: James S. Bianco, Suffield, CT (US)

(73) Assignee: Control Module, Inc., Enfield, CT (US)

( * ) Notice: Subject to any disclaimer, the term of this patent is extended or adjusted under 35 U.S.C. 154(b) by 455 days.

(21) Appl. No.: 13/533,170

(22) Filed: Jun. 26, 2012

(65) Prior Publication Data
US 2013/0015816 A1 Jan. 17, 2013

Related U.S. Application Data

(60) Provisional application No. 61/507,640, filed on Jul. 14, 2011.

(51) Int. Cl.
*H02J 7/00* (2006.01)
*B60L 11/18* (2006.01)

(52) U.S. Cl.
CPC ......... *B60L 11/1818* (2013.01); *B60L 11/1825* (2013.01); *B60L 2230/12* (2013.01); *B60L 2230/16* (2013.01); *Y02T 10/7005* (2013.01); *Y02T 10/7088* (2013.01); *Y02T 90/121* (2013.01); *Y02T 90/128* (2013.01); *Y02T 90/14* (2013.01); *Y02T 90/163* (2013.01)

(58) Field of Classification Search
CPC ........ H02J 7/025; H01F 38/14; Y02T 90/122; B60L 11/182; Y02E 60/12
USPC .......................................... 320/109
See application file for complete search history.

(56) References Cited

U.S. PATENT DOCUMENTS

| | | | |
|---|---|---|---|
| 5,754,124 A | 5/1998 | Daggett et al. | |
| 8,022,667 B2 * | 9/2011 | Anderson ..................... | 320/109 |
| 2010/0013433 A1 * | 1/2010 | Baxter et al. ................. | 320/109 |
| 2010/0013434 A1 * | 1/2010 | Taylor-Haw et al. ......... | 320/109 |
| 2011/0074351 A1 | 3/2011 | Bianco et al. | |
| 2011/0144823 A1 | 6/2011 | Muller et al. | |
| 2011/0172839 A1 * | 7/2011 | Brown et al. ................. | 700/292 |

\* cited by examiner

*Primary Examiner* — Arun Williams
(74) *Attorney, Agent, or Firm* — Alix, Yale & Ristas, LLP

(57) ABSTRACT

A valet EVSE system employs a plurality of outlet stations which are configured with an electrical outlet and brackets for receiving a portable EVSE unit. The portable EVSE unit is configured to removably mount to the brackets and draw power from the electrical outlet. In one embodiment a given station is adapted to receive and supply power to two portable EVSE units. A housing is provided with a pivoted cover for securing the plug of the EVSE unit with the outlet disposed in the housing.

17 Claims, 3 Drawing Sheets

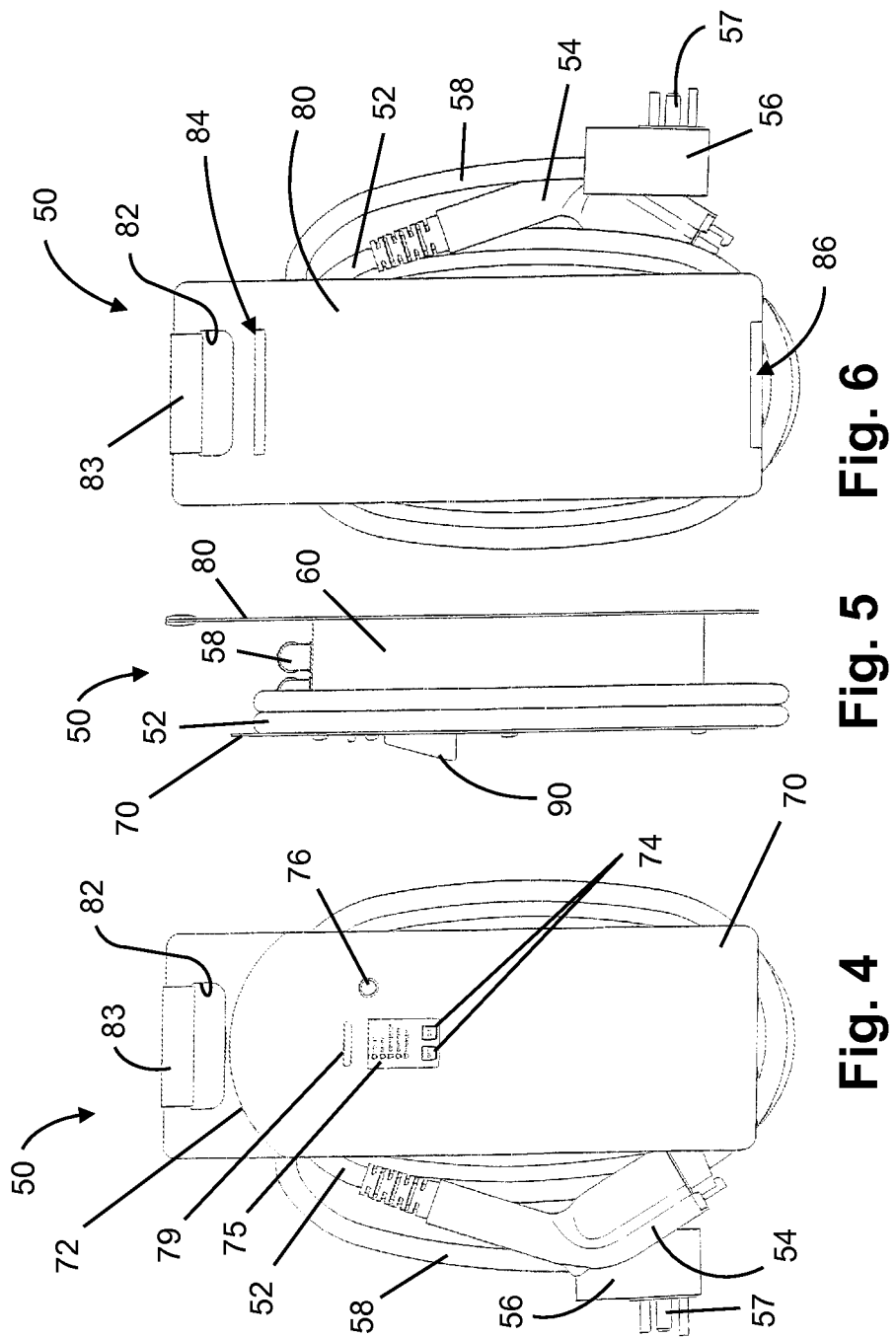

VALET EVSE SYSTEM

CROSS REFERENCE TO RELATED APPLICATION

This application claims the priority of U.S. Provisional Patent Application 61/507,640 filed on Jul. 14, 2011, the entire disclosure of which is incorporated herein by reference.

BACKGROUND

As more and more electric vehicles are employed, the desirability of charging the batteries at public facilities and at off-resident locations becomes more crucial. Electric vehicle service equipment (EVSE) of various configurations is employed to charge the battery power modules of electric vehicles. It is particularly advantageous to charge the electric vehicles while the vehicles are parked for extended times, such as in parking garages and other parking facilities. If the electric vehicle is not parked in a location which has facilities for charging the vehicle, then for some situations, the vehicle must be driven to a charging station, charged and returned to the parking space.

Another problem associated with charging multiple vehicles is having enough available power to simultaneously charge numerous vehicles. It makes little economic sense to provide a complete charging station at each of multiple parking spaces when not every vehicle can be simultaneously charged due to power constraints. Likewise, efficiencies dictate that a given parking space should not be associated with a fixedly located complete charging station if a vehicle parked at the space does not require charging over the entire parking time.

The present disclosure relates to a valet EVSE system which addresses the problem of charging multiple vehicles while they are parked in a facility and provides flexibility so that electric vehicles can be charged without driving the vehicle from the parking space to a charging location and returning same to the parking space.

SUMMARY

Briefly stated, a valet EVSE system comprises a plurality of outlet stations. Each station has an electrical outlet and a pair of vertically spaced brackets. A portable EVSE unit has a front panel, a rear panel, and a power cable with a connector and an electrical plug insertable into the outlet. The rear panel has a slot and an upper handle. The EVSE unit is suspendable by the bracket so that the slot receives the one bracket and the other bracket engages and supports the lower portion of the rear panel, and the plug is electrically connectable with the outlet.

The plug has a neutral pin and two power pins. The neutral pin is preferably shorter than the power pins. Each station comprises a post. In one embodiment, there are two electrical outlets and two pairs of vertically spaced brackets. Each post has a pair of housings projecting from opposed sides of the post. Each housing has an electrical outlet and pivoted cover for the outlet. The EVSE connector plug may be connected to the outlet and secured by the pivoted cover. In one embodiment, the portable EVSE also has a barcode scanner. A solar powered LED may be mounted to the top of the post.

In another embodiment, a valet EVSE system comprises a station having a housing for an electrical outlet and an upright structure mounting a first attachment assembly. A portable EVSE unit has a front panel, a rear panel, a power cable with a connector and an electrical plug insertable in the outlet. The rear panel preferably has an upper handle and a second attachment assembly. The EVSE unit is suspendable in a stable upright relationship with the structure by engagement of the first attachment assembly and the second attachment assembly. The plug is electrically connectable with the outlet. In another embodiment, each upright structure has two electrical outlets and two opposed pairs of first and second attachment assemblies.

BRIEF DESCRIPTION OF THE DRAWINGS

FIG. 4 is a front view of a portable EVSE which is employed in the assembly of FIG. 1;

FIG. 5 is a side elevational view of the portable EVSE of FIG. 4; and

FIG. 6 is a rear view of the portable valet EVSE of FIG. 4.

DETAILED DESCRIPTION

With reference to the drawings wherein like numerals represent like parts throughout the several figures, a dual post/portable valet assembly for a valet EVSE system is designated generally by the numeral 10. The valet EVSE system has particular application in connection with public facilities, such as parking facilities including garages and parking lots, to provide a multitude of highly accessible charging stations wherein a portable EVSE may be transported and electrically connected to a power outlet and an electric vehicle for charging the battery power supply of the electric vehicle.

The valet EVSE system can be efficiently employed to charge multiple electric vehicles which are parked at the parking facility without requiring the vehicle be moved to a fixed charging station and without providing a fixed EVSE at each parking location.

The portable valet system comprises a plurality of outlet stations 12 having at least one electrical outlet connected to a power supply. Preferably, the outlets are located adjacent a parking space. Each of the outlet stations 12 has a bracket assembly for suspending a portable EVSE 14. Preferably, for facilities with numerous outlet stations, multiple portable EVSEs 14 are employed, but for some where the number of outlet stations is limited, only a single EVSE 14 is required. As described below, some outlet stations 12 serve two parking spaces.

Figure 2:
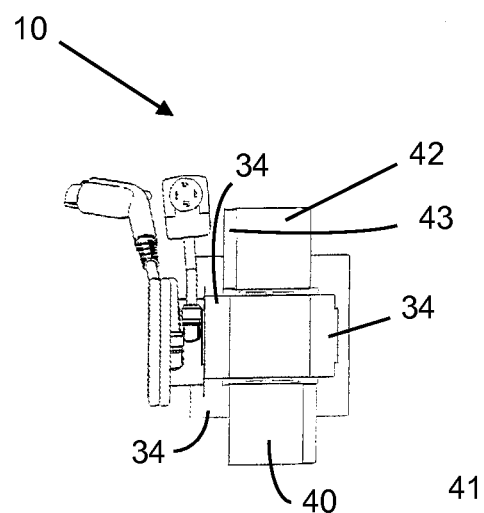
FIG. 2 is a top plan view of the post/EVSE assembly of FIG. 1.
Figure 1:
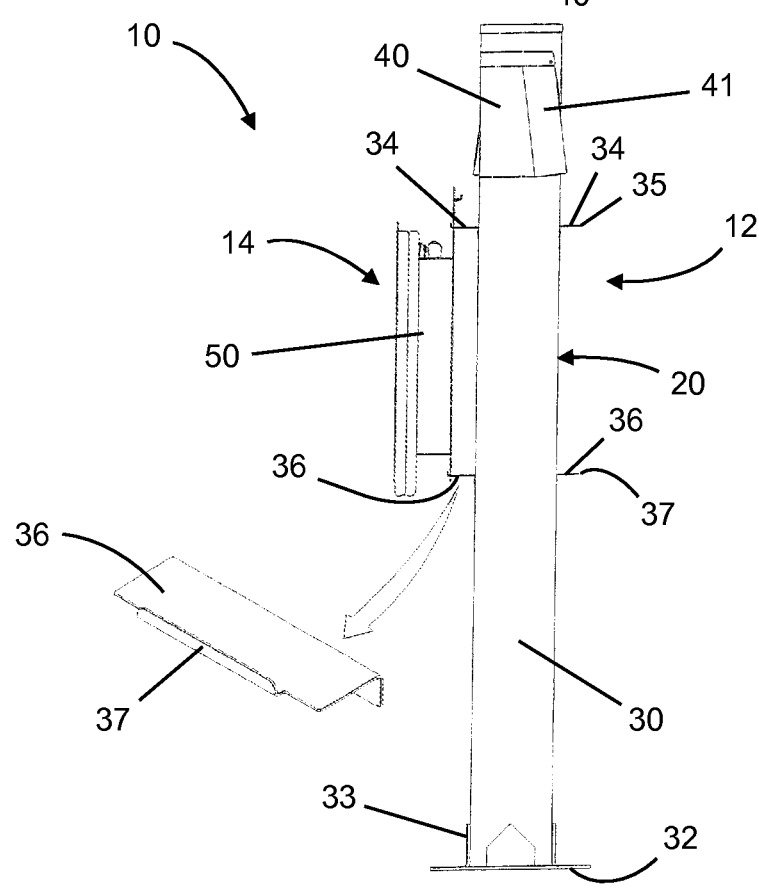
FIG. 1 is a side elevational view of a dual post/portable EVSE assembly for a valet EVSE system with a post bracket being shown in an enlarged exploded view.

With reference to FIG. 1 in one embodiment, a dual outlet station 12 comprises a post assembly generally designated by the numeral 20. The post assembly comprises a tubular post 30 which projects upwardly from a platform 32. The post may be secured to the platform 32 by an anchoring yoke 33. Pairs of substantially identical spaced hanging brackets 34 and 36 are mounted to opposed sides of the post in a vertically spaced outwardly projecting relationship, as will be detailed below. Each bracket 34, 36 preferably has a compound angled form with an upwardly projecting retention lip 35, 37.

Laterally projecting housings 40 and 42 extend outwardly at opposite sides of the post at a height above the brackets. Each housing encloses an electrical outlet (not illustrated). A pivotal outlet cover 41, 43 provides access to the electrical outlet and protects same when not in use. The outlet covers 41, 43 are disposed in opposite orientations relative to the post 30. For some embodiments (not illustrated), the electrical receptacle and the EVSE hanging brackets are mounted to a wall and a post is not employed.

With additional reference to FIGS. 4-6, a portable valet EVSE is generally designated by the numeral 50. The portable EVSE includes a front panel 70 and an opposed rear panel 80. As best illustrated, the portable valet EVSE includes a power cable 52 with a J1772 connector 54 which connects with the electric vehicle charging station outlet terminal accessed via outlet cover 41, 43. Each cover may be locked while the plug is connected with the receptacle to secure the portable EVSE to the post during usage.

An electrical plug 56 at the terminus of a short cord 58 connects to the EVSE and is insertable into the outlet for supplying power to the EVSE unit. The neutral pin 57 disconnects from the outlet shortly before the other plug pins upon removal of the plug 56 from the receptacle.

The EVSE 50 includes a central enclosure 60 disposed between the front panel 70 and the rear panel 80. In a conventional form, the power cable 52 wraps around the enclosure 60 and is confined between the opposed panels.

The rear panel 80 includes an upper opening 82 which forms a handle. A rubber material 83 may be disposed around the upper edge of the panel and the upper portions of the opening 82 to facilitate the portability of the EVSE. An elongated hanger slot 84 is formed below the handle. An anti-rotation notch 86 is formed at the bottom edge of the rear panel. The spacing between the anti-rotation notch 86 and the hanger slot 84 is selected so that the hanger slot 84 receives an upper hanging bracket 34, and the lower hanging bracket 36 may be received by the notch 86 for supporting the portable EVSE unit whereby the portable EVSE may be easily suspended from the post by the brackets in a stable mounting configuration.

For some embodiments (not illustrated) other assemblies for attaching the portable EVSE to the post may be provided. For example, the post may be configured with a hangar slot and a notch and the rear panel of the EVSE may be configured with brackets for engaging the slot and the notch. For all of the embodiments the portable EVSE is suspended from the support structure in a generally upright, stable mounting configuration which allows for the EVSE to be relatively easily removed and re-suspended when required. For all embodiments it is highly desirable to employ the housing for closing an electrical outlet with a cover which may be locked while the EVSE connector plug is connected with the outlet to secure the portable EVSE during usage.

The front panel 70 of the portable EVSE 50 preferably has an upper arcuate edge 72 to allow unimpeded access to the handle opening 82. The panel 70 also includes various switches and/or buttons 72 for operating the portable EVSE. The panel may include various LEDs 75 for indicating the charging/operational status. The front panel may also include an optional charging completion light 76 and an optional RF antenna 78. In one embodiment, the front panel 70 includes an optional barcode scanner 90 (FIG. 5).

Figure 3:
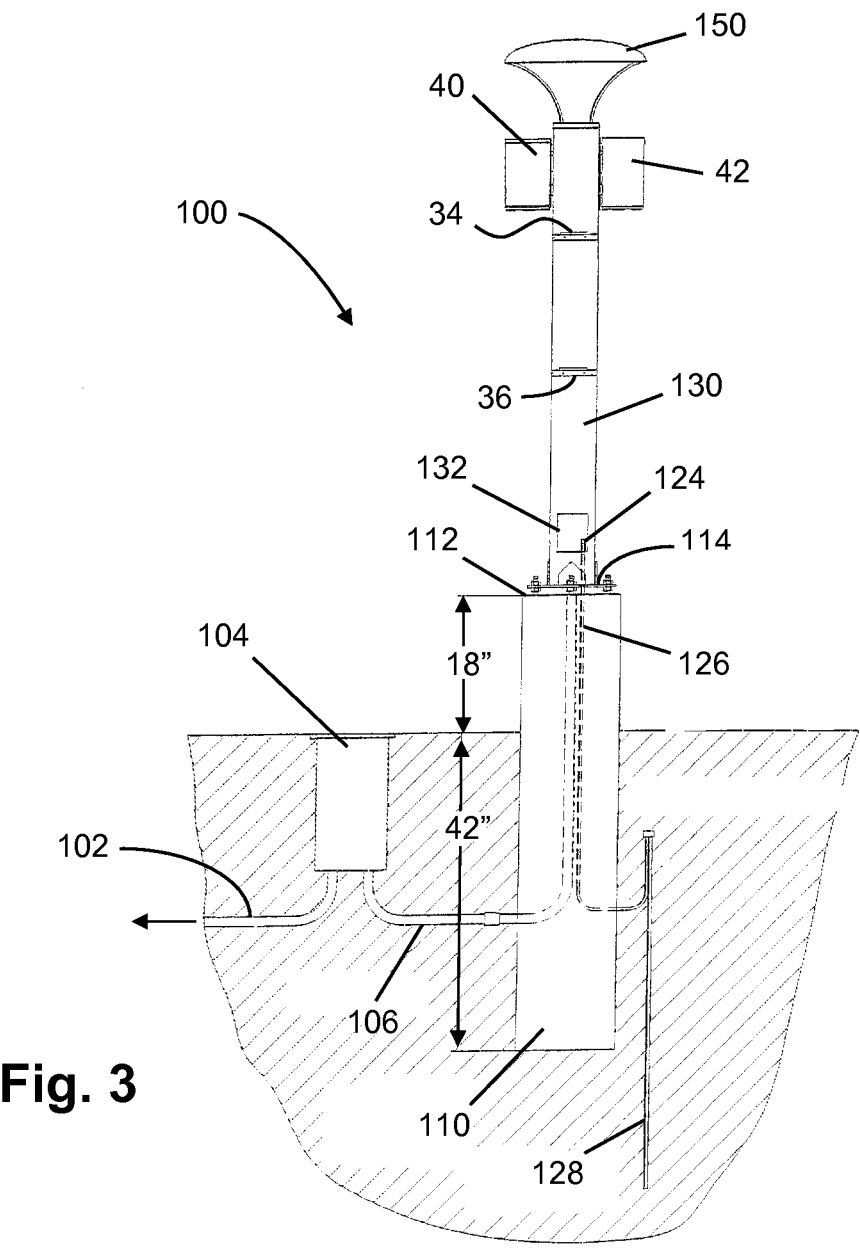
FIG. 3 is a side elevational view of another embodiment of a dual post installation for a valet EVSE system, portions below ground being removed, portions shown in phantom and portions shown in diagram form.

With reference to FIG. 3, a second dual post installation is designated generally by the numeral 100 and is illustrated in connection with the below grade portion of the installation. A pre-cast mounting base 110 includes a central channel for various wires. The top 112 of the base is approximately 18 inches above the grade level. An anchoring bracket 114 is bolted to the base and receives the tubular post 130. An access opening 132 is formed in the lower front of the base. A ground lug 124 is connected to the post for connecting with a No. 8 ground wire 126 and ultimately a ground rod 128 which is installed underground. The power lines 102 from a service panel lead into a hand hole pull box 104 and ultimately connect via a conduit 106 through the base to the post as illustrated. The EVSE mounting brackets 34 and 36 are mounted to the front of the post. The outlet housings 40 and 42 are also mounted in opposed fashion.

An optional solar powered, green LED 150 is disposed at the top of the post for indicating the location of the outlet station.

As previously described with respect to the station 12 of FIG. 1, one portable EVSE unit 50 may be suspended by the EVSE brackets 34 and 36. It will be appreciated that a second EVSE unit may also be suspended on the opposed side of the post if required.

The portable EVSE may be suspended at each station in a wide variety of attachment assemblies. The attachment assemblies are adapted to allow for mounting in a stable upright orientation while also allowing for a efficient removal of the portable EVSE unit once the charging is completed. In addition, it is highly desirable that the station be provided with a housing for the electrical outlet. The housing both protects the outlet and provides a means for securing the portable EVSE unit during usage.

While preferred embodiments of the foregoing have been set forth for purposes of illustration, the foregoing description should not be deemed a limitation of the invention herein. Accordingly, various modifications, adaptations and alternatives may occur to one skilled in the art without departing from the spirit and the scope of the present invention.

The invention claimed is:

1. A valet EVSE system comprising:
   a plurality of outlet stations, each station comprising a housing and a pair of vertically spaced brackets, said housing having an electrical outlet and a pivoted cover for said outlet; and
   a portable EVSE unit, said portable unit comprising a front panel, a rear panel, a power cable with a connector, and an electrical plug insertable in said outlet, said rear panel defining a slot and having an upper handle wherein said EVSE unit is suspendable by said brackets so that said slot receives one bracket and said other bracket engages and supports a lower portion of said rear panel, and said plug is electrically connectable with said outlet;
   wherein when said EVSE unit is suspended by said brackets, said plug connected to said outlet and secured by said pivoted cover.

2. The valet EVSE system of claim 1 wherein said plug has a neutral pin and two power pins, said neutral pin being shorter than said power pins.

3. The valet EVSE system of claim 1 further comprising a post and a pair of housings projecting from opposed sides of said post having two electrical outlets and two pairs of vertically spaced brackets.

4. The valet EVSE system of claim 1 wherein said portable EVSE has a barcode scanner.

5. The valet EVSE system of claim 1 further comprising a switch or button on said front panel for operating the portable EVSE.

6. A valet EVSE system comprising:
   a station comprising a housing and a pair of vertically spaced brackets, said housing having an electrical outlet and a pivoted cover for said outlet; and
   a portable EVSE unit, said portable unit comprising a front panel, a rear panel, a power cable with a connector, and an electrical plug insertable in said outlet, said rear panel defining a slot and having an upper handle wherein said EVSE unit is suspendable by said brackets so that said slot receives one bracket and said other bracket engages and supports a lower portion of said rear panel, and said plug is electrically connectable with said outlet;

wherein when said EVSE unit is suspended by said brackets, said plug connected to said outlet and secured by said pivoted cover.

7. The valet EVSE system of claim 6 wherein said plug has a neutral pin and two power pins, said neutral pin being shorter than said power pins.

8. The valet EVSE system of claim 6 further comprising a post and a pair of housings projecting from opposed sides of said post having two electrical outlets and two opposed pairs of vertically spaced brackets.

9. The valet EVSE system of claim 8 further comprising a solar powered LED mounted at a top portion of the post.

10. The valet EVSE system of claim 6 wherein said portable EVSE has a barcode scanner.

11. The valet EVSE system of claim 6 further comprising a switch or button on said front panel for operating the portable EVSE.

12. A valet EVSE system comprising:
   a station comprising a housing for an electrical outlet having a pivoted cover and an upright structure mounting a first attachment assembly; and
   a portable EVSE unit, said portable unit comprising a front panel, a rear panel, and a power cable with a connector and an electrical plug insertable in said outlet, said rear panel having an upper handle and a second attachment assembly wherein said EVSE unit is suspendable in a stable upright relationship with said structure by engagement of said first attachment assembly and said second attachment assembly, and said plug is electrically connectable with said outlet;

wherein when said EVSE unit is suspended by said brackets, said plug connected to said outlet and secured by said pivoted cover.

13. The valet EVSE system of claim 12 wherein said plug has a neutral pin and two power pins, said neutral pin being shorter than said power pins.

14. The valet EVSE system of claim 12 further comprising a post and a pair of housings projecting from opposed sides of said post having two electrical outlets and two opposed pairs of first and second attachment assemblies.

15. The valet EVSE system of claim 12 wherein said portable EVSE has a barcode scanner.

16. The valet EVSE system of claim 12 further comprising a solar powered LED mounted at a top portion of the upright structure.

17. The valet EVSE system of claim 12 further comprising a switch or button on said front panel for operating the portable EVSE.

* * * * *